United States Patent [19]
Tsuchida et al.

[11] Patent Number: 4,887,170
[45] Date of Patent: Dec. 12, 1989

[54] MAGNETIC RECORDING/REPRODUCING APPARATUS FOR MAGNETICALLY REPRODUCING SIGNALS FROM ONE TAPE AND RECORDING THE SIGNALS ONTO A SECOND TAPE

[75] Inventors: Masami Tsuchida; Shiro Suzuki; Kiichiro Koguchi; Tokihiro Takahashi; Takayuki Sato, all of Saitama, Japan

[73] Assignee: Pioneer Electronic Corporation, Tokyo, Japan

[21] Appl. No.: 316,540

[22] Filed: Feb. 28, 1989

Related U.S. Application Data

[63] Continuation of Ser. No. 884,343, Jul. 11, 1986, abandoned.

[30] Foreign Application Priority Data

Jul. 11, 1985 [JP] Japan .................................. 60-74725

[51] Int. Cl.4 ............................ G11B 5/86; G11B 5/02
[52] U.S. Cl. ......................................... 360/15; 360/68
[58] Field of Search ..................... 360/15, 46, 61, 68

[56] References Cited

U.S. PATENT DOCUMENTS 4,396,955  8/1983  Kohtani et al. .................. 360/61
4,495,526  1/1985  Baranoff-Rossine ............ 360/15
4,496,997  1/1985  Ohtsuki ............................. 360/15
4,663,674  5/1987  Osawa .............................. 360/15

FOREIGN PATENT DOCUMENTS 0105807  8/1980  Japan ............................... 360/61

OTHER PUBLICATIONS

*Video* Magazine, pp. 88, 90, Jun. 1981.
*High Fidelity*, p. 54, Dec. 1982.
Showtime Specification Sheet-Video Stabilizer VV-170S, 1982.
"A Random Access System Adapted . . . Retrieval", Michel Matthieu, SMPTE Journal, Feb. 1977, vol. 86, pp. 80-83.

Primary Examiner—Vincent P. Canney
Attorney, Agent, or Firm—Sughrue, Mion, Zinn, Macpeak & Seas

[57] ABSTRACT

A recording/reproducing apparatus for transferring both information signals and address signals from one tape to another. A first tape is reproduced while monitoring the reproduced signal for the presence of address signals. When an address signal is detected, recording of the reproduced signal on the second tape is halted, and a new address signal corresponding to the detected address signal is generated and recorded on the second tape.

11 Claims, 1 Drawing Sheet

MAGNETIC RECORDING/REPRODUCING APPARATUS FOR MAGNETICALLY REPRODUCING SIGNALS FROM ONE TAPE AND RECORDING THE SIGNALS ONTO A SECOND TAPE

This is a continuation of application Ser. No. 884,343 filed July 11, 1986, now abandoned.

BACKGROUND OF THE INVENTION

For a tape on which are recorded a plurality of musical selections (or information sections), by recording an address signal between each selection, a desired one of the selections can readily be found. Conventionally, recording of such address signals together with the musical selections they identify has been carried out with an arrangement as shown in FIG. 1.

In this device, a tape on which are recorded the musical selections or the like is reproduced by a reproducing device 1, and the output signal of the reproducing device 1 is supplied to a magnetic recording head 4 through an amplifier 2 and an adder 3. The magnetic head 4 is disposed to record magnetic signals on a magnetic tape 5, the latter being driven by a driving device 6, to thereby record the musical selections on the tape 5. It is difficult, however, to correctly transfer address signals through the amplifier 2 because their frequency (about 10 Hz) is much lower than the frequencies of the audio signals. This problem occurs whether the signals to be recorded are in analog or digital form. Therefore, it has been the practice to sum the address signals with the audio output of the amplifier 2 with the adder 3 and to manually actuate a switch 8 between musical selections to effect the recording of the address signals.

This approach, however, has the drawback that recording the address signals is cumbersome due to the necessity of having to manually actuate the switch 8 between musical selections.

SUMMARY OF THE INVENTION

Accordingly, it is an object of the invention to provide a magnetic recording/reproducing apparatus in which the above-mentioned drawback has been eliminated.

In accordance with the present invention, there is provided a magnetic recording/reproducing apparatus comprising means for reproducing an information signal and an address signal recorded on a first magnetic tape, means for recording a signal reproduced from the first tape by the reproducing means, means for detecting address signals occurring at irregular intervals in the reproduced signal, means for generating a new address signal when the detecting means has detected an address signal, the new address signal corresponding to the detected address signal, recording means, and means for transferring the address signal generated by the address generating means to the recording means whereby the address signal contained in the reproduced signal is automatically replaced by a new address signal and the new address signal is recorded on the second magnetic tape during the transfer of signals from the first tape to the second tape, thereby making it possible to correctly record the desired address signals on the second tape automatically.

DESCRIPTION OF THE PREFERRED EMBODIMENTS

Figure 2:
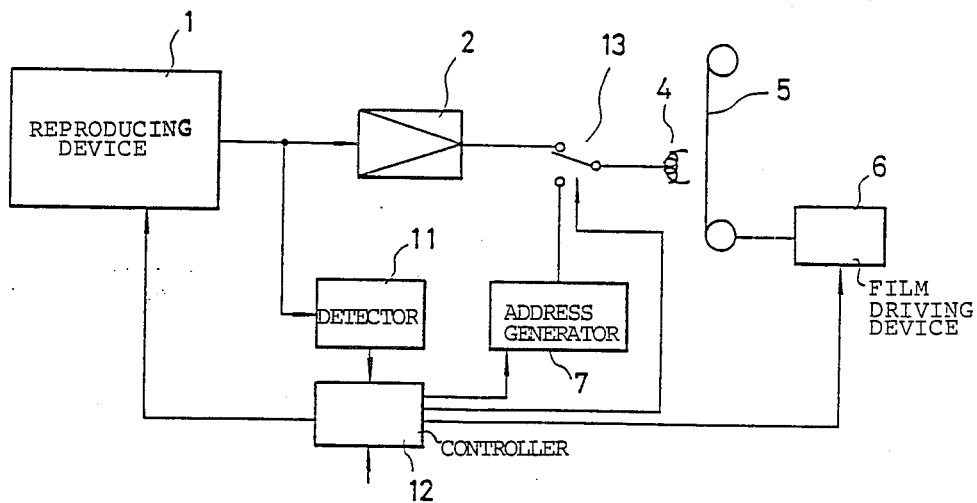
FIG. 2 is a block diagram of a magnetic recording/reproducing apparatus of the present invention.
Figure 1:
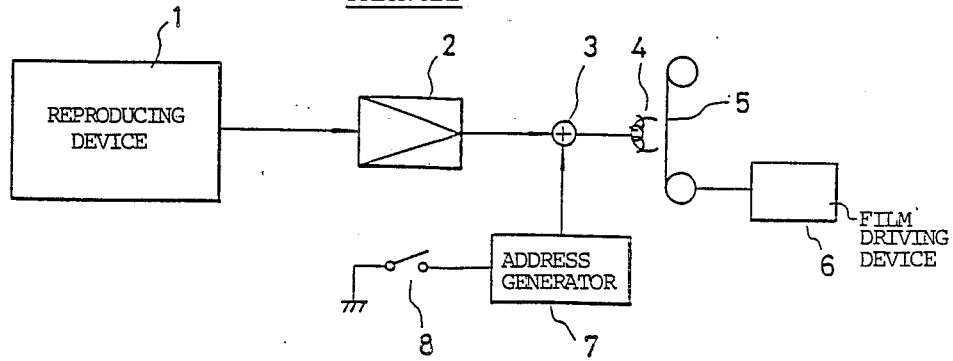
FIG. 1 is a block diagram of a conventional magnetic recording/reproducing apparatus.

A magnetic recording/reproducing apparatus constructed according to the teachings of the present invention will be described with reference to the block diagram of FIG. 2. In FIG. 2, elements identified by like reference numerals in FIG. 1 are similar, and hence a further detailed description thereof will be omitted.

In this preferred embodiment of a magnetic recording/reproducing apparatus of the invention, the signal reproduced by the reproducing device 1 is applied to a detector 11 which detects the presence of an address signal. The output detection signal from the detector 11 is applied to a controller 12, which may be constituted by a microcomputer or the like. The controller also receives as an input signal a command signal from an input unit (not shown) for controlling the reproducing device 1, a driving device 6, and an address generator 7.

Reference numeral 13 designates a switch acting as a transfer device for transferring a reproduced signal from the reproducing device 1 or an address signal from the address generator 7 to the magnetic head 4 used to record signals on the second magnetic tape. The switch 13 is controlled by the controller 12 to alternately select the reproduced signal and the address signal for recording on the second tape 5 by the magnetic head 4. The remainder of the apparatus of FIG. 2 is the same as the conventional apparatus of FIG. 1.

The operation of the magnetic recording/reproducing apparatus of the invention will now be described.

When an appropriate operating command is received from the input unit (not shown), the controller 12 applies signals for starting the reproducing operation of the first magnetic tape (not shown) and for instructing the running of the magnetic tape 5 by the driving device 6. The reproduced signal from the reproducing device is applied to the magnetic head 4 through the amplifier 2 and the switch 13 so as to record the reproduced information signal on the magnetic tape 5.

When the detector 11 has sensed the presence of an address signal in the reproduced signal from the first tape, the controller 12 applies a control signal to the reproducing device 1 to temporarily suspend the reproduction of the first magnetic tape. Also, the controller instructs the address generator 7 to produce an address signal corresponding to (the same as) the address signal detected by the detector 11 and sets the switch 13 to the side of the address generator 13. As a result, an address corresponding to that detected by the detector 11 is applied to the magnetic head 4 and recorded on the second magnetic tape 5.

In the case where a relatively long time is required to detect the address signal, generate the corresponding address signal, and record the new address signal on the second tape, it may be desirable to adjust the recording timing, for example, by stopping the second tape for a predetermined period prior to recording the new address signal.

An address signal may, for example, be constituted by 13 cycle periods of a 10 Hz signal. More specifically, a logic bit "1" can be represented by a single cycle of the 10 Hz signal, and a logic bit "0" by the absence of such a cycle. Further, if right- and left-channel stereo signals are to be recorded, it is possible to employ respective address signals for the respective right and left channels which are opposite in phase. Still further, in the address signal the first three and last three of the 13 bits may be used for clock and sync signals, respectively, a predetermined bit, for instance, the fourth bit, used for identifying the side of a tape cassette (side A represented by a "1" and side B by a "0"), and the remaining bits (fifth through tenth bits in this example) used for the actual address code. Moreover, one of the address codes may be assigned as an "end-of-the-tape" signal. It may also be advantageous in some applications to provide "silent" areas around the recorded address signals to make it possible to readily distinguish the address signals from the recorded music.

After an address signal has been recorded, the controller 12 causes the reproducing device 1 to restart the reproducing operation of the first tape and reset the switch 13 to the side of the amplifier 2. The operations described above are then repeated until the end of the first tape is reached.

When an end signal is detected by the detector 11, or when an end portion (leader) is detected by a separate detector (not shown) after the final musical selection has been reproduced, the controller 12 produces control signals which end the reproducing and recording operations.

It should be noted that, although the description above is related to the recording of analog information and address signals, the inventive concept is equally applicable to the case of digital information and address signals.

Moreover, although the switch 13 is used as a transfer device in the above-described embodiment, an adder may be used for this purpose if the address signal is sufficiently attenuated by the amplifier 2. Alternatively, a muting circuit may be provided for muting the reproduced signal during the intervals between musical selections to a level sufficiently low as to not interfere with the recording of the address signals.

In the invention as described herein, address signals are accurately recorded on a tape without having to operate a manual switch between musical selections. Therefore, use of the invention results in significantly improved recording efficiency.

This completes the description of the preferred embodiments of the invention. Although preferred embodiments have been described, it is believed that numerous modifications and alterations thereto without departing from the spirit and scope of the present invention would be apparent to one of ordinary skill in the art.

What is claimed is:

1. A magnetic recording/reproducing apparatus for transferring an information signal from a first tape to a second tape, wherein said information signal comprises a plurality of information portions separated from one another by respective unique address signals said apparatus comprising:
   means for reproducing a signal recorded on a first magnetic tape;
   means for detecting an address signal from the reproduced signal;
   means for generating a new address signal when said detecting means has detected an address signal, said new address signal corresponding to the detected address signal; and
   transferring means for applying to an input of said recording means one of said reproduced signal and said address signal generated by said address signal generating means selected in accordance with an output of said address detecting means such that said address signal contained in said reproduced signal is automatically replaced by a new address signal and said new address signal is recorded on said second magnetic tape during the transfer of signals from said first tape to said second tape, thereby making it possible to correctly record said address signals on said second tape automatically.

2. The magnetic recording/reproducing apparatus of claim 1, wherein said transferring means comprises a switch.

3. The magnetic recording/reproducing apparatus of claim 1, wherein said transferring means comprises an adder.

4. The magnetic recording/reproducing apparatus of claim 1, wherein said transferring means comprises a muting circuit.

5. The magnetic recording/reproducing apparatus of claim 1, wherein said information signal is in digital form.

6. The magnetic recording/reproducing apparatus of claim 1, wherein said information signal is in analog form.

7. The magnetic recording/reproducing apparatus of claim 6, wherein said new address signal is composed of a plurality of bits, some of said bits including clock and synchronizing information.

8. The magnetic recording/reproducing apparatus of claim 7, wherein a final address code contains an end-of-the-tape indication.

9. The magnetic recording/reproducing apparatus of claim 1, wherein said information portions are independently selectable.

10. The magnetic recording/reproducing apparatus of claim 9, wherein said information portions comprise respective audio selections.

11. A magnetic recording/reproducing apparatus for transferring an information signal from a first tape to a second tape, wherein said information signal comprises a plurality of information portions separated from one another by respective unique address signals said apparatus comprising:
    means for reproducing a signal recorded on a first magnetic tape;
    means for detecting an address signal from the reproduced signal;
    means for generating a new address signal when said detecting means has detected an address signal, said new address signal corresponding to the detected address signal; and
    transferring means for applying to an input of said recording means one of said reproduced signal and said address signal generated by said address signal generating means selected in accordance with an output of said address detecting means that said address signal contained in said reproduced signal is automatically replaced by a new address signal and said new address signal is recorded on said second magnetic tape during the transfer of signals from said first tape to said second tape, thereby making it possible to correctly record said address signals on said second tape automatically; wherein said address signals occur at irregular intervals.

* * * * *